United States Patent [19]
Novil et al.

[11] Patent Number: 5,586,769
[45] Date of Patent: Dec. 24, 1996

[54] HEAD GASKET WITH PRE-EMBEDDED METAL SHIM AND METHOD OF USING SAME

[75] Inventors: Martin Novil, Bristol, Wis.; Michael O'Brien, Addison, Ill.

[73] Assignee: Fel-Pro Incorporated, Skokie, Ill.

[21] Appl. No.: 432,947

[22] Filed: May 1, 1995

[51] Int. Cl.$^6$ ....................................................... F16J 15/08
[52] U.S. Cl. ............................. 277/1; 277/180; 277/235 B
[58] Field of Search ..................... 277/180, 234, 277/235 B, 1

[56] References Cited

U.S. PATENT DOCUMENTS

| | | | |
|---|---|---|---|
| 1,864,854 | 6/1932 | Oven | 277/235 B |
| 1,903,990 | 4/1933 | Fitzgerald | 277/235 B |
| 4,284,282 | 8/1981 | Lönne | 277/235 B |
| 4,705,278 | 11/1987 | Locacius et al. | 277/235 B |
| 4,781,389 | 11/1988 | Beyer et al. | 277/235 B |
| 4,810,454 | 3/1989 | Belter | 277/235 B |
| 4,998,741 | 3/1991 | Udagawa | 277/235 B |
| 5,120,078 | 6/1992 | Udagawa | 277/180 |
| 5,306,023 | 4/1994 | Udagawa | 277/235 B |
| 5,360,219 | 11/1994 | Okuda et al. | 277/235 B |

FOREIGN PATENT DOCUMENTS

| | | | |
|---|---|---|---|
| 538541 | 4/1993 | European Pat. Off. | 277/235 B |
| 2347231 | 3/1975 | Germany | 277/235 B |

*Primary Examiner*—Scott Cummings
*Attorney, Agent, or Firm*—Laff, Whitesel, Conte & Saret, Ltd.

[57] ABSTRACT

A head gasket comprising a laminate, metallic core and fiber-elastomer facing layers on each major surface of the core and defining a plurality of combustion openings, oil and water holes and bolt holes. A thin shim is disposed on one of the facing layers. The shim has arcuate elements lying adjacent to each of a pair of adjacent combustion openings. U-shaped armors at each combustion opening have legs overlapping the edges of the facing layers and portions of the shim elements adjacent to the edges of the combustion openings, with the shim elements extending radially outwardly beyond the armor legs. When the armors, shim and facing layer are precompressed after assembly and during the manufacturing process, the facing layer is densified through a reduction in thickness under the armor, is greatly densified under the armor and shim through a reduction in thickness by approximately the thickness of the shim, and densified in proportion to the shim thickness where the shim elements extend radially outwardly beyond the legs. The gasket is substantially unreduced in thickness radially beyond the shim and armor.

5 Claims, 2 Drawing Sheets

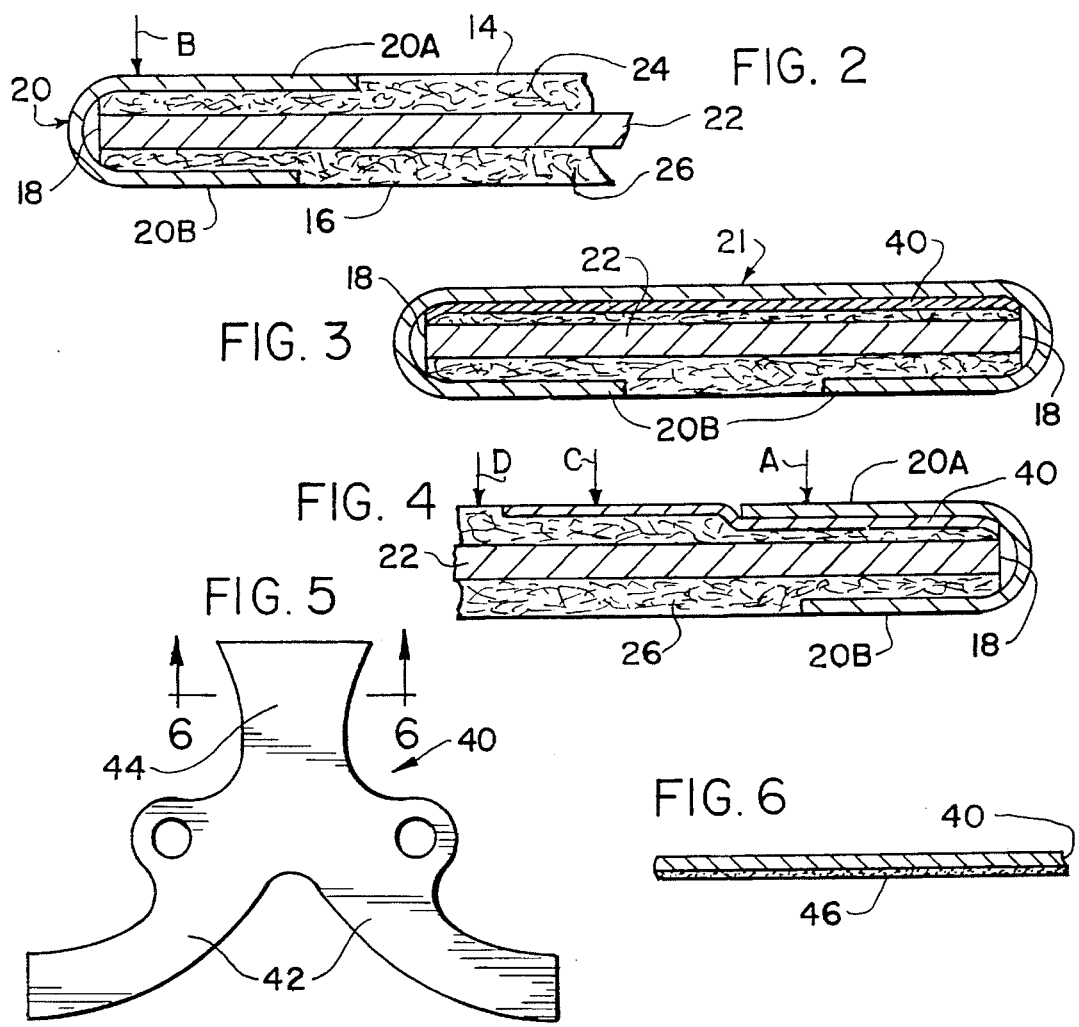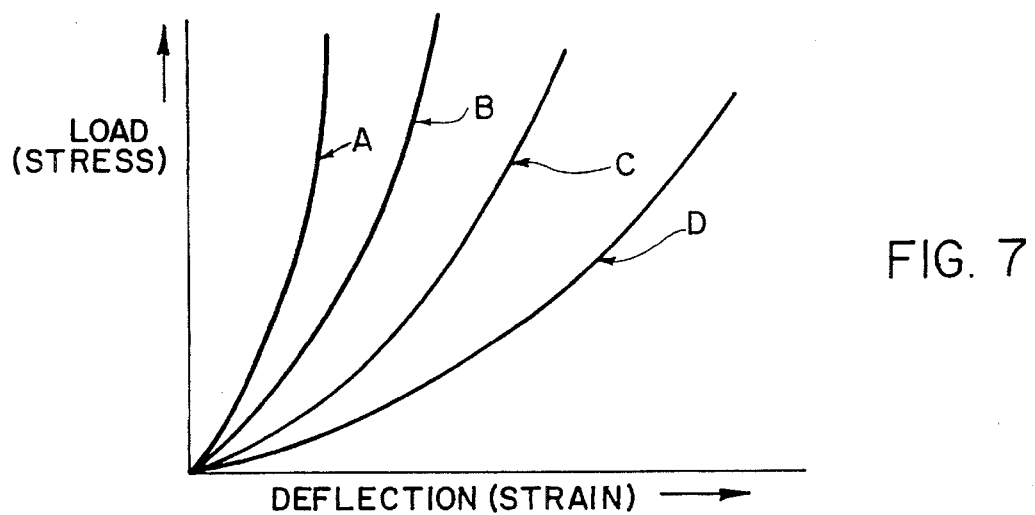

5,586,769

HEAD GASKET WITH PRE-EMBEDDED METAL SHIM AND METHOD OF USING SAME

BACKGROUND OF THE INVENTION

Head gaskets employing laminated bodies with U-shaped armors at the combustion openings produce consistently effective seals, both for conventional automotive engines and diesel engines. Occasionally, however, the configuration of the engine or the location of precombustion chambers in diesel engines are such that they produce localized zones of exceedingly high stress which so deform the gasket in use that under some operating conditions, the gasket will fail to seal consistently and in an effective manner.

A typical such gasket which encounters sealing difficulties under some circumstances is one in which the precombustion chambers of two adjacent cylinders are closely adjacent to each other, thereby producing an abnormally high local temperature. The high temperature tends to cause the engine head to deform and distort non-uniformly, resulting in abnormal local loads at the armors. This so-called "thermal push" causes the armors to stress more in that local area than elsewhere. Thus, the armor is distorted and the underlying facing layer of the laminate is likewise distorted. The net result is that the zone of the armor which is excessively distorted will not recover sufficiently to provide an effective seal at the time of engine start-up. That being so, gases will escape and power will be lost.

It would be desirable to eliminate the deleterious effects of thermal-push in zones of close adjacency of precombustion chambers.

SUMMARY OF THE INVENTION

In accordance with the present invention, a head gasket is provided which is specially constructed to eliminate the adverse effects of excessive temperatures in diesel or gasoline engines, such as thermal push encountered where a pair of pre-combustion chambers are closely adjacent or where back-to-back exhaust valves similarly cause excessive stress. The head gasket comprises a laminate defining a plurality of combustion openings and oil and water holes and bolt holes. The laminate comprises a metallic core having a pair of main surfaces and fiber-elastomer facing layers on each main surface of the core. U-shaped armors are disposed in each combustion opening. The armors have legs overlapping the edges of the facing layers adjacent the edges of the combustion openings.

A thin shim is disposed on at least one of the facing layers and desirably has a thickness less than that of the facing layer. The shim comprises first and second elongated arcuate elements, one of which underlies a portion of a leg of a first armor and the other of which underlies a portion of an adjacent leg of the second adjacent armor. Both of the elements extend radially outwardly from the armor legs. When the armors, shim and facing layer are compressed, and the shim is pre-embedded, the facing layer is greatly reduced in thickness under the armor, is reduced in thickness by approximately the thickness of the shim where the elements extend radially outwardly beyond the legs, and is substantially unreduced in thickness radially beyond that. In a preferred form, the armors are integrally formed and interconnected adjacent their zones of adjacency, the shim comprises integrally formed arcuate elements, and the shim extends beneath the interconnected portions of the armors.

The invention also comprises a method of making a gasket employing a shim so positioned.

Further objects, features and advantages of the present invention will became apparent from the following description and drawings.

BRIEF DESCRIPTION OF THE DRAWINGS

FIG. 2 is a cross-sectional view taken along line 2—2 of FIG. 1;

FIG. 3 is a cross-sectional view taken along line 3—3 of FIG. 1;

FIG. 4 is a cross-sectional view taken along line 4—4 of FIG. 1;

FIG. 5 is a plan view of the shim used in FIG. 1 prior to trimming and assembly with the gasket of FIG. 1;

FIG. 6 is a cross-sectional view taken along line 6—6 of FIG. 5; and

FIG. 7 is a representational load deflection curve illustrating the operation of a gasket of the present invention.

DETAILED DESCRIPTION

Figure 1:
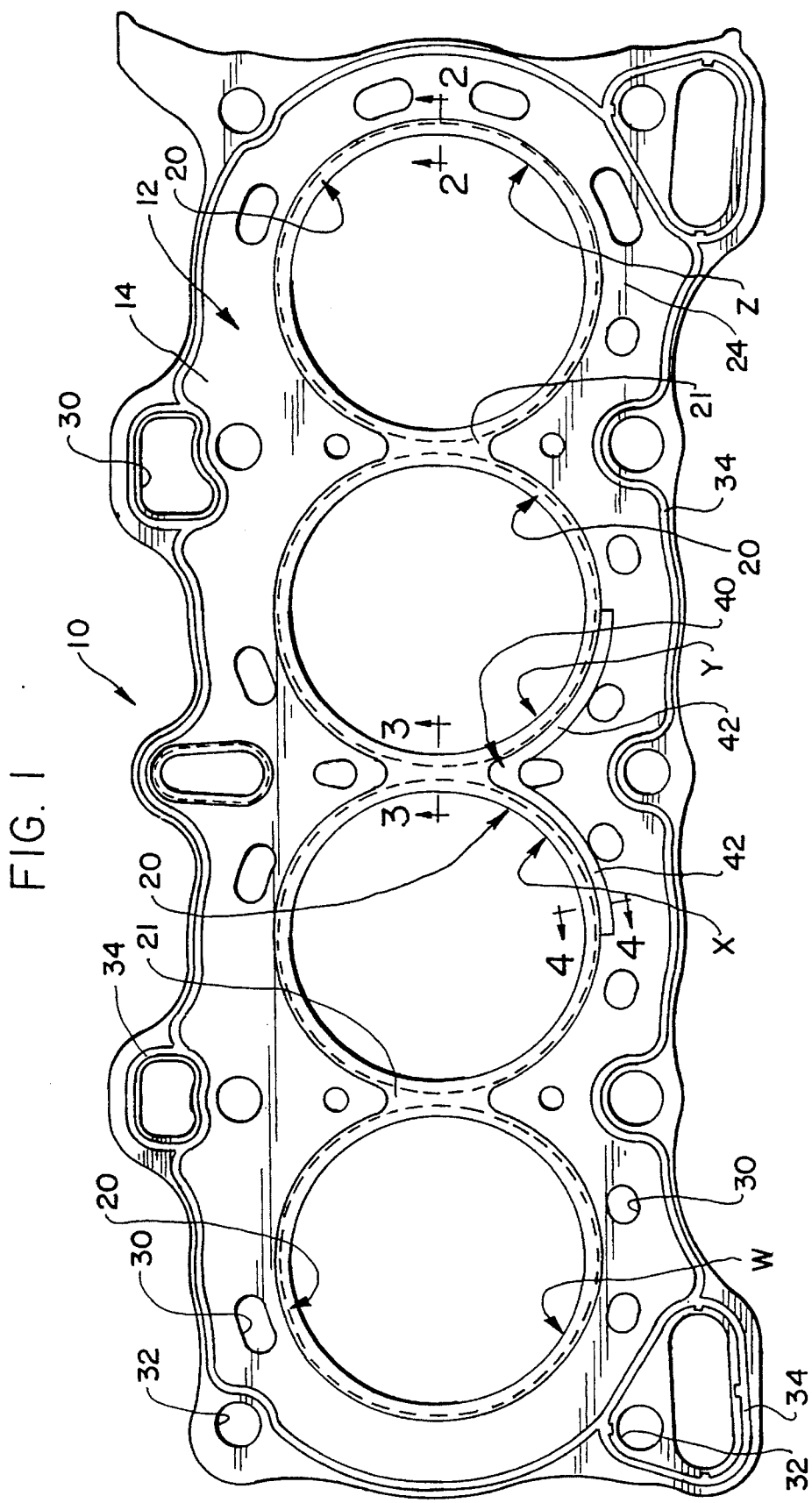
FIG. 1 is a plan view of a gasket made in accordance with the present invention.

Referring now to the drawings, a head gasket 10 in accordance with this invention is shown in plan view in FIG. 1. Head gasket 10 comprises a main gasket body 12 having two main surfaces, upper and lower surfaces 14, 16, and plural combustion openings 18. Each combustion opening is armored, as with a conventional U-shaped armor 20. Armors 20 are integrally formed and are interconnected adjacent their zones of adjacency (at 21) in a conventional manner.

Main gasket body 12 is formed of a plurality of layers which are laminated. The layers include a central metal core 22, and a pair of fiber-elastomer facing layers 24, 26, which provide the upper and lower main surfaces 14, 16. The fiber-elastomer facing layers may comprise glass fibers or other fibrous material with an elastomer, such as a nitrile, neoprene or polyacrylic elastomer, as a binder. Fillers and other conventional ingredients may be present as well. The core and facing layers are laminated to each other in a known manner.

The gasket 10 defines a plurality of suitable openings such as fluid openings 30 for water and oil, and bolt holes 32, as well as the combustion openings 18 which are armored. Sealing aids, such as silicone beads 34 deposited by silk-screening may be provided around the water and oil holes, and elsewhere if desired.

The engine with which gasket 10 is to be used provides precombustion chambers at locations W, X, Y and Z (see FIG. 1). As may be appreciated, the location of two such chambers in close adjacency at X and Y produces excessive stress and sealing demands on the gasket due to the extreme heat generated and the fact that the head tends to flex and distort causing thermal push. Thermal push tends to distort the gasket permanently, as explained above.

In accordance with the present invention, a metallic shim 40 is positioned in the vicinity of locations X, Y. Shim 40 is of a wishbone shape. Shim 40 has a pair of elongated arcuate legs or elements 42 projecting from a central element or stem 44. Elements 42 underlie the adjacent legs 20A of the armor, and extend radially outwardly therefrom. They also underlie the portion of the armor assembly joining the adjacent armors 20. The gasket in the zone of the shim 40 is precompressed at the time of manufacture so that the shim embeds into the facing layer 24 to the level of the surface thereof in the radially outwardly extending sections. In assembly the shim embeds even more deeply in the zones of the leg 20A of the armor. As may be seen in FIG. 4, the upper legs 20A of the armors further compress the facing layer so that it is most compact and dense thereunder. This produces a gradual change from the zone of abnormally high loading and stress (under leg 20A) to the areas in which the facing layer is fully capable of functioning normally under loading. Under full load, the graded changes in stress on the facing layer results in equalized strain across the entire gasket in the vicinity of the armor using the pre-embedded shim design of the present invention.

As will be clear from the drawings, the compression of the facing material by the shim makes it stiffest under the armor and somewhat stiffer in the radially outward zone. The significance of this will be apparent from FIG. 7 which is a load deflection curve.

As seen in FIG. 7, a representational load deflective curve for an uncompressed facing shows that for a given increase in load, the deflection is relatively great. If the facing is permanently compressed at an elevated load, then for some distance along the deflection line, there may be an open gap from start-up until a condition is reached in which the engine expands to close the gap.

However, with the load deflection curves being steeper in the precompressed zones under the armor and adjacent to the armor because of the presence of the pre-embedded shim, higher stress levels can be experienced at equivalent strain levels at locations A (FIG. 4) relative to B (FIG. 2) and location C (FIG. 4). relative to D (FIG. 4). The result is maintaining a close to linear stress/strain relationship even under higher loading stresses if a pre-embedded shim is used. Thermal push is eliminated as a degradation to the gasket; the gasket operates in its elastic, rather than its plastic range.

Thus, the use of the pre-embedded shim of the present invention under the armor to provide graded zones of increased stiffness under and adjacent to the armor ameliorates the effects of localized thermal push. Without pre-embedding the shim, the proper materials densification would not be possible and the desired effect would not be attained.

Conventional shims used in head gaskets at the intersections of combustion openings, sometimes referred to as dogbone shims, are typically of a bow-tie shape. They do not have elongated or projecting legs underlying the adjacent armor, and do not have portions which extend radially outwardly of the curved armor portions. Thus, in use, they function only to accommodate the higher loads applied in the zone of the intersections of adjacent combustion openings. As such, both prior to and after installation, gaskets employing such dogbone Shims have facing density differences ranging from a greatest density under the armor at the location of the shim, a lesser density under the armor where there is no shim, and a still lesser density in the main body of the facing layer.

As will be appreciated from the foregoing, the head gasket of the present invention is critically different in that, inter alia, substantial integral portions of the shim extending along portions of the armor legs project beyond the legs of the armor to provide another intermediate density level in critical sealing areas.

A specific head gasket made in accordance with the present invention may comprise a laminate having a cold rolled steel core 22 of 0.018 inch and facing layers 0.020 inch thick. The preferred facing layers comprise aramid fibers such as Kevlar (available from DuPont) with a nitrile binder. The armor comprises a 0.008 inch-321 type stainless steel with a leg 20A (from the nose) of about 0.15 to 0.17 inch and a leg 20B (from the nose) of about 0.115 to 0.135 inch. The shim 40 is from 0.0040 to 0.0055 inch thick aluminum with an self-adhering adhesive backing, protected until use and application by a release sheet 46 (FIG. 6). The shim may project radially outwardly beyond the armor by about 0.125 inch to provide the stepped down, intermediate precompressed region. After assembly, the gasket is precompressed at the factory to make certain that the shim is properly embedded in the facing layer. One cannot depend upon compression in the service environment because, frequently, insufficient loading is available to effect the needed embedment.

Although the shim 40 has been shown to be of a uniform thickness, where desired it may have graded thicknesses according to the environment and requirements of a particular application.

It will be apparent to those skilled in the art that modifications may be made without departing from the spirit and scope of the present invention. Accordingly, the claims are intended to embrace all modifications within their scope.

What is claimed is:

1. A head gasket comprising a laminate defining a plurality of combustion openings, oil and water holes and bolt holes, said laminate comprising a metallic core having a pair of main surfaces and fiber-elastomer facing layers on each main surface of said core, and U-shaped armors in each of a pair of adjacent combustion openings and having legs overlapping the edges of the facing layers adjacent edges of said combustion openings, and a thin pre-embedded shim disposed on at least one of the facing layers, said shim comprising first and second elongated arcuate elements which extend beyond the zone of adjacency of the adjacent pair of combustion openings, one of which underlies a portion of a leg of a first armor and the other of which underlies a portion of an adjacent leg of a second adjacent armor, said first and second arcuate elements extending radially beyond the first and second armors, whereby when said armors, shim and facing layer are compressed, the facing layer is reduced in thickness under said armor, the facing is reduced to a lesser extent by the portions of said shim extending radially beyond the armor, and is substantially unreduced in thickness radially beyond the armor and shim elements.

2. The head gasket of claim 1, and wherein said shim is of a thickness less than that of the facing layer on which it is disposed.

3. The head gasket of claim 1, and wherein both of said shim arcuate elements extend radially outwardly from said armor legs, and when said armors, shim and facing layer are compressed, the facing layer is reduced in thickness and densified by approximately the thickness of the shim where the shim elements extend radially outwardly beyond the armor legs.

4. The head gasket of claim 1, and wherein the armors are integrally formed and interconnected adjacent their zones of adjacency and said shim comprises integrally formed arcuate elements and said shim extends beneath the interconnected portions of said armors.

5. A method of reducing the susceptibility of a head gasket to the effects of excessively high local stress comprising the steps of providing a head gasket comprising a laminate, said gasket defining a plurality of adjacent combustion openings, oil and water holes and bolt holes, said laminate comprising a metallic core having a pair of main surfaces and fiber-elastomer facing layers on each main surface of said core, disposing a thin metallic shim on at least one of the facing layers, said shim having elongated arcuate elements lying adjacent to each of a pair of adjacent combustion openings, said shim having a thickness less than that of the facing layer and precompressing the thin metallic shim into the facing layer, then disposing U-shaped armors in each combustion opening with legs thereof overlapping the edges of the facing layers as well as portions of said arcuate elements adjacent to the edges of the combustion openings, both of said arcuate elements extending beyond the zone of adjacency of adjacent combustion openings, and extending radially outwardly beyond said armor legs, and prior to installation of the gasket in a service environment, compressing said facing layer under said armor and shim, whereby the facing layer is reduced in thickness under said armor at the locations of said shim, is reduced in thickness by approximately the thickness of the shim where the arcuate elements extend radially outwardly beyond the legs, and is substantially unreduced in thickness radially beyond that.

* * * * *